United States Patent

Stieringer

[15] 3,635,549

[45] Jan. 18, 1972

[54] METHOD AND MEANS FOR PRODUCING FADE-IN AND FADEOUT EFFECTS WITH MOTION PICTURE CAMERAS

[72] Inventor: Albert Stieringer, Calmbach, Germany

[73] Assignee: Robert Bosch Photokino GmbH, Stuttgart-Unterturkheim, Germany

[22] Filed: Mar. 23, 1970

[21] Appl. No.: 21,677

[30] Foreign Application Priority Data

Mar. 25, 1969 Germany......................P 19 14 979.2

[52] U.S. Cl................................................................352/91
[51] Int. Cl...................................G03b 19/18, G03b 21/36
[58] Field of Search.....................................................352/91

Primary Examiner—S. Clement Swisher
Attorney—Michael S. Striker

[57] ABSTRACT

A motion picture camera with automatic dissolving shutter wherein the takeup reel for exposed film is rotated at a reduced speed for a first interval prior to and for a second interval during exposure with fadeout effect so that it collects during the two intervals only that length of film which is exposed during the first interval prior to fadeout. The film which is exposed during fadeout is stored in the space surrounding the takeup reel and is subsequently transported rearwardly to be stored in the space surrounding the supply reel. The once-exposed film is thereupon withdrawn from the space surrounding the supply reel and is exposed for the second time with fade-in effect while the takeup reel rotates at normal speed to collect such film at the rate at which it is transported by the pulldown. A timer which is started in response to reduction in the speed of the takeup reel actuates the dissolving shutter motor to start the fadeout effect after elapse of the first interval and arrests the pulldown and the drive for the takeup reel after elapse of the second interval.

19 Claims, 3 Drawing Figures

INVENTOR
Albert STIERINGER
BY
Michael S. Striker
his ATTORNEY

METHOD AND MEANS FOR PRODUCING FADE-IN AND FADEOUT EFFECTS WITH MOTION PICTURE CAMERAS

CROSS-REFERENCE TO RELATED APPLICATION

The motion picture camera of the present invention constitutes an improvement over and a further development of the camera which is disclosed in the copending application Ser. No. 701,280 filed Jan. 29, 1968 by Hansjorg Braun and assigned to the same assignee.

BACKGROUND OF THE INVENTION

The present invention relates to a method and means for producing fade-in and fadeout effects with motion picture cameras. More particularly, the invention relates to improvements in a method and means for preparing that length of motion picture film which was exposed with fadeout effect for transport in rearward direction subsequent to completion of fadeout and prior to producing the fade-in effect. Still more particularly, the invention relates to improvements in a method and means for preparing such length of once-exposed film for transport in rearward direction in a motion picture camera wherein the takeup reel for exposed film can be driven in a direction to collect exposed film but is blocked against rotation in the opposite direction.

The copending application Ser. No. 701,280 discloses a motion picture camera wherein the takeup reel is arrested for fadeout so that the space around the takeup reel collects film which is transported by the pulldown of the film transporting mechanism during fadeout. Such film forms in the film cassette or in the film chamber of the motion picture camera one or more loose loops occupying a space which is invariably available around the takeup reel. Upon completion of exposures with fadeout effect, the once-exposed film is transported rearwardly so that the loop or loops are transferred into the space surrounding or adjacent to the supply reel for unexposed film. In the next step, the pulldown is caused to transport the film forwardly and the takeup reel is rotated at normal speed to collect the film which is exposed with fade-in effect and to thereupon collect the next-following (once-exposed) film frames which are exposed to scene light with the dissolving shutter in fully open position. A timer mechanism insures that the film frames which were exposed for the first time during fadeout are exposed again during fade-in, i.e., that the last part of the preceding scene fades out and that the first part of the next scene fades in, which produces the impression that the preceding scene melts into the next.

The camera of the aforementioned copending application Ser. No. 701,280 embodies a device which blocks or brakes the takeup reel to hold it against rotation while the motor continues to drive the pulldown to transport the film forwardly during fadeout, or a device which interrupts the driving connection between the motor and the takeup reel during fadeout. Each of these proposals exhibits the drawback that the load upon the motor changes suddenly when the fadeout begins and that such operation at a different load continues during the entire interval which is required to complete the exposures with fadeout effect. This can cause a substantial change in rotational speed of the motor with the result that the pulldown transports the film at a different frequency. If the takeup reel or the element which drives the takeup reel is blocked by a braking or arresting device, the drive between the motor and the takeup reel must include a friction clutch which becomes operative as soon as the takeup reel is arrested or braked. The suddenly increased load upon the motor can cause an appreciable reduction in the motor speed to thus effect the frequency at which the film is transported by the pulldown or by an analogous film-transporting device. If the takeup reel is to be arrested in response to manual operation of a device (e.g., a disengageable clutch) which interrupts the drive between the motor and the takeup reel, the result is just the opposite, i.e., the load upon the motor decreases suddenly and its speed increases to thus increase the frequency of film frame transport by the pulldown or by other film transporting means. Even the provision of a customary speed regulator cannot prevent at least some changes in motor speed when the drive for the takeup reel is interrupted in order to start exposures with fadeout effect.

SUMMARY OF THE INVENTION

An object of the invention is to provide a novel and improved method of preparing a certain length of motion picture film for transport in the rearward direction subsequent to completion of exposures with fadeout effect and prior to exposing with fade-in effect.

Another object of the invention is to provide a method according to which fadeout, rearward transport of film, and fade-in can be performed without causing any appreciable changes in the frequency at which the motor of the motion picture camera drives the film transporting mechanism, namely, a claw pulldown or an analogous device which places successive film frames into registry with the optical system during normal operation (forward transport of the film and the dissolving shutter fully open), during fadeout, and during fade-in.

A further object of the invention is to provide a motion picture camera with novel and improved means for manipulating the film prior to and during fadeout, subsequent to fadeout (preparatory to fade-in), and during fade-in, without any appreciable changes in the speed of the motor which drives the film-transporting mechanism and the takeup reel.

An additional object of the invention is to provide a camera which embodies an automatic dissolving shutter with novel means for insuring that all film frames which are exposed with fadeout effect can be exposed with fade-in effect and for insuring that fadeout, subsequent rearward transport of once-exposed film frames, and fade-in can be carried out without any appreciable fluctuations in the number of frames which are exposed to scene light per unit of time.

The method of the present invention involves manipulation of motion picture film during and subsequent to fadeout and during fade-in in a motion picture camera wherein unexposed film is withdrawn from a source and the exposed film is normally collected by a takeup reel which is confined to rotation in a single direction, namely, in a direction to collect exposed film. The method comprises the steps of 1. withdrawing unexposed film from the source at a predetermined frequency and simultaneously rotating the reel at a first speed which is high enough to enable the reel to collect all of the thus withdrawn film (this is the normal operation of the motion picture camera, with the dissolving shutter in fully open position);

2. continuing with the withdrawal of unexposed film at the predetermined frequency e.g., at 18 frames per second), simultaneously reducing the speed of the reel to a lesser second speed e.g., to a speed which equals one-third of the first speed) so that the reel collects only a fraction of the film and the remainder of the film forms in the region of the reel at least one loose loop of predetermined length, and exposing such predetermined length of the film with fadeout effect;

3. transporting the predetermined (once exposed) length of the film rearwardly to the general region of the source; and 4. transporting the predetermined length of the film forwardly at the predetermined frequency, rotating the reel at the first speed so that the reel collects the predetermined length of film, and exposing such predetermined length for the second time but with fade-in effect.

The aforementioned remainder of the film is preferably looped directly around the takeup reel, for example, in the space which surrounds the takeup reel in a magazine or cassette which accommodates the source and the takeup reel. The predetermined length of film is preferably exposed with fadeout effect with a predetermined delay following the reduction in speed of the takeup reel, and the forward transport of the film during rotation of the reel at the second speed is terminated simultaneously with termination of the fadeout effect.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a diagram which illustrates the formation of loops of motion picture film during and subsequent to fadeout and during fade-in.

DESCRIPTION OF THE PREFERRED EMBODIMENTS

Figure 1:
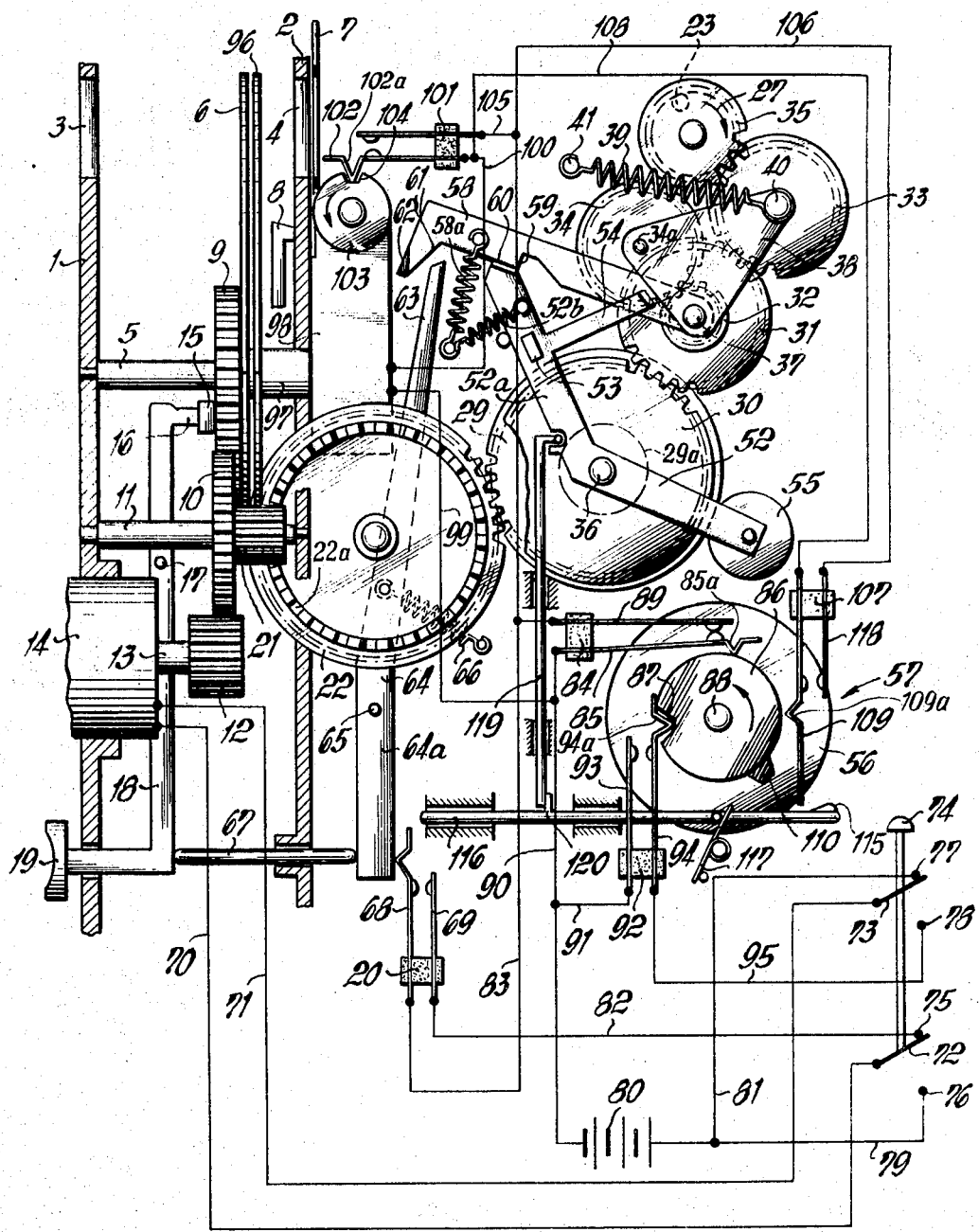
FIG. 1 is a fragmentary partly diagrammatic and partly longitudinal vertical section view of a motion picture camera which embodies the invention.

FIG. 1 shows a portion of a motion picture camera whose housing or body includes two parallel vertical walls or panels 1, 2 respectively provided with registering light-admitting openings or windows 3, 4. The automatic dissolving shutter of the camera comprises a shaft 5 which is journaled in the front panel 1 and carries a fixedly mounted shutter blade 6 provided with a suitable cutout (not shown) which permits light to pass from the window 3 to the window 4 once during each revolution of the shaft 5. The motion picture film 7 is transported stepwise along a path which extends behind the rear window 4. The film transporting mechanism comprises a customary pulldown 8 whose claw enters the perforations of film 7 and normally moves it downwardly, as viewed in FIG. 1, always by the length of a frame and, at a desired frequency, for example, at 18 frames per second. The means for rotating the shutter blade 6 comprises a gear 9 which is coaxially secured to the shaft 5 and meshes with a second or intermediate gear 10 fixed to a shaft 11. The gear 10 meshes with a gear 12 on the shaft 13 of a prime mover here shown as a reversible electric motor 14 whose casing is mounted in the front panel 1. The gear 9 is provided with an eccentric projection 15 which can be engaged and arrested by the tip 16 of a two-armed starter lever 18 mounted on a pivot pin 17 and having a depressible starter knob 19 which is accessible at the front side of the panel 1. When the knob 19 is actuated, the lever 18 pivots in a counterclockwise direction, as viewed in FIG. 1, and the tip 16 moves away from the path of the projection 15. Such pivotal movement of the starter lever 18 also results in completion of the circuit of the motor 14, namely, in closing of a master switch 20.

Figure 2:
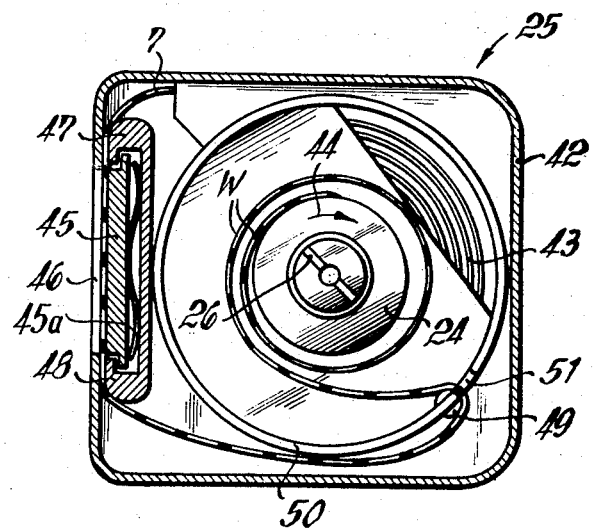
FIG. 2 is a sectional view of a magazine or cassette for motion picture film which can be utilized in the motion picture camera of FIG. 1, showing the manner in which the film is looped around the takeup reel during fadeout.

The shaft 11 for the intermediate gear 10 further carries a gear 21 meshing with a crown gear 22a which is rigid or integral with a spur gear 22 forming part of a variable-speed drive including an output member or pin 23 which can rotate the core 24 of the takeup reel in a film magazine or cassette 25 shown in FIG. 2. The pin 23 is provided off center on a gear 35 and can engage a diametral rib 26 of the core 24 when the magazine 25 is properly installed in the housing of the motion picture camera. In normal operation, the gear 21 causes the gear 35 to rotate in the direction indicated by arrow 27. The just mentioned drive further includes six additional gears 29–34, a pivotable platelike carrier 38 and a spring 39. The gear 29 is mounted on a fixed shaft 36 and meshes with the gear 22. The gear 30 normally receives torque from the gear 29 and meshes with the gear 31 which is mounted on a shaft 37. A friction clutch 29a is provided to normally rotate the gear 30 in response to rotation of the gear 29. The gear 32 is fixed to and is coaxial with the gear 31 and meshes with the gear 34 which is rotatably mounted on a shaft 34a provided on the carrier 38. The diameter of the gear 32 is considerably smaller than that of the gear 31 and the latter meshes with the gear 33 which is mounted on a shaft 40 provided on the carrier 38 and meshes with the gear 35 when the latter is out of mesh with the gear 34. The carrier 38 is pivotable on the common shaft 37 of the gears 31 and 32. The ratio of the two-speed transmission including the gears 31–35 is selected in such a way that, when the gear 35 is driven by the gear 33, the core 24 of the takeup reel in the magazine 25 rotates at a higher first speed which at least corresponds to the normal film transporting speed of 18 frames per second. Any difference is taken up by the clutch 29a; this clutch insures that the convolutions of exposed film 7 are tightly packed around the core 24 when the film is transported forwardly at normal speed.

When the plate 38 is pivoted to a second position to disengage the gear 33 and to simultaneously move the gear 34 into mesh with the gear 35, the speed of the core 24 is reduced to a fraction of its first speed because the ratio of the gear train including the gears 32, 34, 35 is considerably less than that of the gear train 31, 33, 35. Thus, when the gear 35 is driven by the gear 34, the core 24 is rotated at a second speed which is considerably less than the speed of film transport by the pulldown 8. Therefore, the core 24 cannot cause convolution of the entire exposed film whereby the latter forms one or more loose loops W (shown in FIG. 2) which accumulate in the space provided in the magazine 25 around the core 24. The loose loops W are withdrawn from such space in response to rearward transport of the film 7 subsequent to completion of exposures with fadeout effect but prior to fade-in. For example, the difference between the first and second rotational speeds of the core 24 (when the gear 35 is respectively driven by the gears 33, 34) can be selected at three-to-one, i.e., the core 24 will convolute six frames per second when the gear 35 is driven by the gear 34 and 18 frames per second when the gear 35 is driven by the gear 33. Consequently, the length of the loop or loops W in the space around the core 24 will correspond to the combined length of 12 film frames if the core 24 is driven at reduced speed for an interval of one second while the pulldown 8 transports the film 7 forwardly at the normal speed of 18 frames per second.

The spring 39 is coupled to the shaft 40 on the carrier 38 and to a fixed post 41 in the housing of the motion picture camera. This spring tends to pivot the carrier 38 in a counterclockwise direction, as viewed in FIG. 1, so as to maintain the gear 33 in mesh with the gear 35. Such first or normal position of the carrier 38 is shown in the drawing.

The magazine 25 of FIG. 2 comprises a casing or shell 42 which accommodates the core 24 of the takeup reel and which further accommodates a source of unexposed motion picture film here shown as a supply reel 43. The core of the supply reel 43 is coaxial with the core 24. The ends of the film 7 are attached to the two cores in the customary way and an intermediate portion of the film is caused to pass behind a film gate 46 located in front of a pressure plate 45 which is biased toward the gate by a spring 45a. A customary blocking device (not shown) is provided in the casing 42 to prevent rotation of the core 24 in a counterclockwise direction, i.e., the core 24 is confined to rotation in the direction indicated by arrow 44 and thereby collects some or all of the exposed film when the rib 26 is driven by the pin 23 of the gear 35. When the magazine 25 is properly inserted into the housing of the motion picture camera, the gate 46 is located behind the window 4 in the rear panel 2 and the film which extends in front of the pressure plate 45 is in the range of the claw on the pulldown 8. The casing 42 further accommodates suitable guides 47, 48, 49 which insure that the film travelling from the supply reel 43 toward the core 24 of the takeup reel advances along a predetermined path a portion of which extends between the gate 46 and the pressure plate 45. The supply reel 43 is surrounded by ring-shaped wall 50 having an aperture or slot 51 for the passage of film 7. The wall 50 also surrounds the aforementioned space around the core 24 and its internal diameter approximates the diameter of the outermost convolution of film on the core 24 when the entire film is exposed.

The shaft 36 for the coaxial gears 29, 30 serves as a pivot for a two-armed speed changer or shifter lever 52 (FIG. 1) having a knob 53 which is accessible at the exterior of the camera housing. The arm 52a of the lever 52 is provided with an extension or pusher 54 which pivots the carrier 38 in a clockwise direction (to stress the spring 39) when the shifter lever 52 is pivoted in a clockwise direction, i.e., such pivotal movement of the lever 52 causes the core 24 of the takeup reel in the magazine 25 to rotate at the lesser of two speeds. The other arm of the lever 52 carries a rotary friction wheel 55 which is driven by the teeth of the gear 29 to normally rotate in a clockwise direction, as viewed in FIG. 1, and which serves to drive the friction wheel 56 of a timer mechanism 57 when the shifter lever 52 is pivoted in a clockwise direction to reduce the speed of the core 24. The purpose of the timer mechanism 57 is to automatically arrest the motor 14 upon completion of exposures with fadeout effect and upon completion of rewinding of that portion of the film 7 (loops W) which was exposed during fadeout.

The shifter lever 52 is biased by a spring 52b which tends to maintain it in the illustrated first position, i.e., which automatically effects return movement of the carrier 38 to the position shown in FIG. 1 when the knob 53 is released. The spring 52b further tends to maintain the friction wheel 55 out of engagement with the friction wheel 56 of the timer mechanism 57.

The shaft 37 for the gears 31, 32 and carrier 38 supports a pivotable locking pawl 58 which cooperates with the shifter lever 52 and is biased in a counterclockwise direction by a spring 58a. A notch 59 provided in an intermediate portion of the pawl 58 can receive and retain a bent over protuberance or lug 60 of the shifter lever 52 when the latter is pivoted clockwise against the opposition of the spring 52b. Thus, the user merely pivots the lever 52 in a clockwise direction when the exposures with fadeout effect are to begin, whereby the lug 60 enters the notch 59 and the locking pawl 58 automatically retains the shifter lever 52 in the other end position in which the friction wheel 55 engages the friction wheel 56 and the gear 34 meshes with the gear 35.

The locking pawl 58 has a pallet or nose which is provided with two cam faces 61 and 62. These cam faces can cooperate with the tip 63 of a two-armed disengaging lever 64 which is pivotable at 65 and whose lower arm 64a constitutes a trip serving to close the master switch 20 in response to depression of the starter knob 19 on the lever 18. A reciprocable push rod 67 is provided to pivot the disengaging lever 64 counterclockwise (against the opposition of a helical spring 66) in response to counterclockwise pivotal movement of the lever 18. The push rod 67 is reciprocable in a bearing provided therefor in the rear panel 2. The master switch 20 is normally open and includes a first contact 69 and a movable second contact 68 which is moved against the contact 69 by the arm 64a in response to depression of the starter knob 19.

When the starter knob 19 is actuated to pivot the disengaging lever 64 against the opposition of the spring 66, the tip 63 of the lever 64 travels along the cam face 61 of the locking pawl 58 and pivots the latter in a clockwise direction, as viewed in FIG. 1, to bypass the cam face 61 when the master switch 20 is closed. Then the starter knob 19 is released, the spring 66 pivots the disengaging lever 64 in a clockwise direction (back to the position shown in FIG. 1) whereby the tip 63 slides along and bypasses the cam face 62 of the locking pawl 58 without any effect.

The motor 14 of the drive for the core 24 is connected with the movable contacts 72, 73 of a reversing switch by conductors 70, 71. Each of the contacts 72, 73 forms part of a two-way switch and these contacts can be moved from the illustrated positions to second positions by a common actuator knob 74. The two-way switch including the movable contact 72 further includes two fixed contacts 75, 76 and the other two-way switch includes the fixed contacts 77, 78. The fixed contact 76 is connected to one pole of an energy source 80 (e.g., one or more batteries) by a conductor 79. A conductor 81 connects the one pole of the energy source 80 with the fixed contact 77. The fixed contact 75 is connected with one terminal of the master switch 20 by a conductor 82. The other terminal of the master switch 20 is connected by a conductor 83 with one terminal of an arresting switch 84 which is controlled by the timer mechanism 57. The arresting switch 84 has a first contact 89 and an elastic second contact 85 which engages the periphery of a switch closing cam 86 forming part of the timer mechanism 57. The switch 84 can open when a tooth 85a of the movable contact 85 enters a notch 87 of the cam 86. The cam 86 and the friction wheel 56 are secured to each other and are mounted for rotation on a shaft 88. In normal operation of the motion picture camera, the cam 86 assumes the position shown in FIG. 1 in which the notch 87 receives a tooth 94a on the movable contact 94 of a second arresting switch 92. The latter further includes a second contact 93 and one of its terminals is connected with the other pole of the energy source 80 by way of conductors 91, 90. The conductor 90 is further connected with the other terminal of the arresting switch 84. A further conductor 95 connects the other terminal of the arresting switch 92 with the fixed contact 78.

The just described circuitry forms two circuits which enable the motor 14 to rotate forwardly or backwards. These circuits can be completed by the operator in response to depression of the knob 19 (forward operation) or in response to depression of the knob 74. The arresting switch 84 is installed in that circuit which must be completed to effect rotation of the motor 14 in a forward direction; this switch opens on operation of the timer mechanism 57, i.e., on engagement of the friction wheel 55 with friction wheel 56 whereby the latter rotates the cam 86 in a counterclockwise direction until the tooth 85a enters the notch 87. When the tooth 85a enters the notch 87, the tooth 94a of the movable contact 94 engages the periphery of the cam 86 so that the arresting switch 92 is then closed.

If the operator depresses the knob 74, the motor 14 is caused to rotate in reverse whereby the pulldown 8 advances the film 7 stepwise counter to the normal direction of transport. The friction wheel 55 causes the cam 86 of the timer mechanism 57 to rotate in a clockwise direction to effect closing of the arresting switch 84 and to effect opening of the arresting switch 92 when the notch 87 returns to the position shown in FIG. 1. The arresting switch 92 then opens the motor circuit and terminates the transport of the film 7 in rearward direction.

The dissolving shutter of the motion picture camera further comprises an adjustable second blade 96 which is located behind the blade 6 and is also provided with a cutout (not shown) which normally registers with the cutout of the blade 6. The means for adjusting the angular position of the blade 96 with reference to the blade 6 to thereby reduce the amount of scene light reaching the window 4 during each revolution of the shaft 5 comprises a hollow shaft 97 which is coaxial with the shaft 5 and is journaled in the rear panel 2. The shaft 97 can be rotated by an electric motor 98 which is mounted at the rear or inner side of the panel 2. The motor 98 is connected with the other pole of the energy source 80 by a conductor 99 and through the intermediary of the aforementioned conductor 90. A second conductor 100 for the motor 98 is connected to one terminal of a switch 101 which opens the circuit of the motor 98 upon completion of fadeout as well as upon completion of fade-in. To this end, the movable contact 102 of the switch 101 comprises a tooth or follower 102a which engages the periphery of a switch closing cam 103 and can enter a notch 104 of the cam 103 when the latter assumes the angular position shown in FIG. 1. The other terminal of the switch 101 is connected (via conductor 105) to the aforementioned conductor 83 and to a further conductor 106 which is connected to one terminal of a switch 107 in parallel with the switch 101. The other terminal of the switch 107 is connected to the one terminal of the switch 101 (i.e., to the conductor 100) by a conductor 108.

The switch 107 is controlled by the timer mechanism 57 and includes a first contact 118 and a movable second contact 109 having a tooth 109a which engages the periphery of the cam 86. The switch 107 is normally open and closes only when the tooth 109a engages a projection or lobe 110 of the cam 86. Closing of the switch 107 results in starting of the motor 98. The position of the lobe 110 on the cam 86 is selected in such a way that a certain interval elapses after the timer mechanism 57 is set in operation, i.e., that engagement of the friction wheel 55 with the friction wheel 56 is followed by closing of the switch 107 with a predetermined delay. For example, if the interval during which the timer mechanism 57 operates is 6 seconds, the lobe 110 engages the tooth 109a and closes the switch 107 with a delay of 2 seconds. Thus, the start of rotation of the core 24 of the takeup reel at the lesser of two speeds precedes by 2 seconds the start of angular movement of the adjustable shutter blade 96 with reference to the front shutter blade 6. Such movement of the blade 96 effects gradual reduction of the effective size of the cutout in the blade 6 to zero so that the camera produces a fadeout effect. The speeds of the switch closing cams 86 and 103 are synchronized in such a way that the cam 86 effects opening of the arresting switch 84 (termination of rotation of the motor 14 in a forward direction) simultaneously with opening of the switch 101 which then arrests the motor 98 in a position in which the shutter blades 6, 96 cooperate to completely seal the rear window 4 against entry of scene light.

Figure 3:
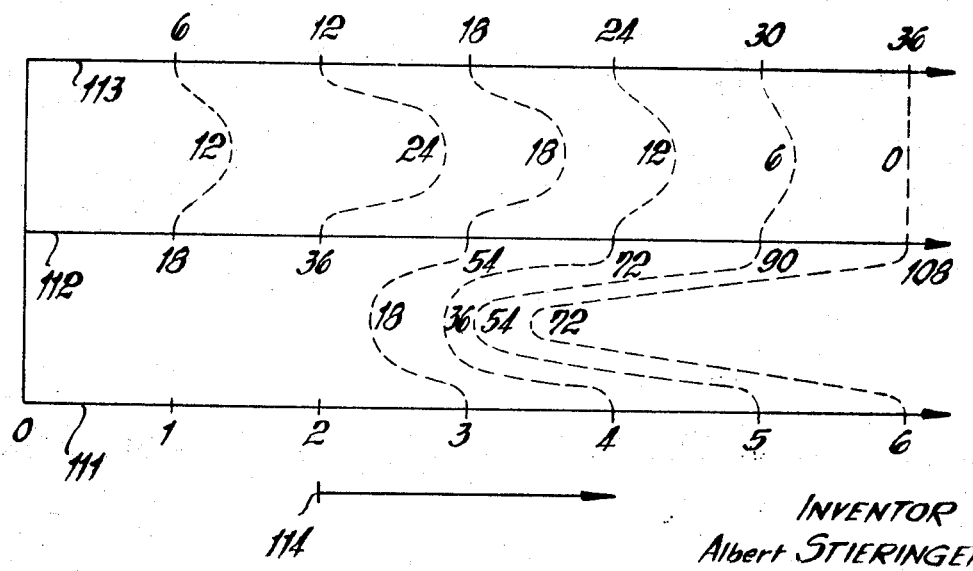

The rotation of core 24 of the takeup reel at the lesser second speed and the delay of the start of fadeout following the reduction in speed of the core 24 bring about the results shown schematically in FIG. 3 of the drawing which illustrates various stages in the transport and winding of the film 7. The graduations on the line 111 of the diagram shown in FIG. 3 represent increments of time in seconds. The graduations on the line 112 indicate lengths of film (in frames) which are transported by the pulldown 8. The line 113 is graduated to indicate lengths of film (in frames) which are convoluted on the core 24 while the latter is driven at the lesser of two speeds (by the gear 34). The diagram shows that, during the first 2 seconds, the pulldown 8 transports a total of 36 film frames. The fadeout begins after elapse of 2 seconds (as indicated at 114). During the first 2 seconds, the core 24 collects only 12 film frames; thus, the length of the loop or loops W in the space surrounded by the ring-shaped wall 50 of the magazines 25 corresponds to the combined length of 24 film frames. This length is collected by the core 24 during the next 4 seconds of rotation at the lesser second speed (i.e., six frames per second). During the 4 seconds of exposures with fadeout effect, the pulldown 8 transports a total of 72 film frames which are looped in the space around the core 24. The first 36 film frames (namely, those which are transported by the pulldown during the first 2 seconds) are not exposed with fadeout effect so that the 24 frames which are collected by the core 24 during the next 4 seconds are exposed in the customary way with the blades 6, 96 defining an aperture of maximum size. The 72 frames which are transported by the pulldown 8 during the last 4 seconds of rotation of core 24 at the lesser speed are exposed with the fadeout effect because the motor 98 moves the blade 96 with reference to the blade 6 to gradually reduce the effective size of the aperture to zero. These 72 frames are those which form the loop or loops W upon completion of fadeout i.e., after elapse of 6 seconds following the start of rotation of the core 24 at the lesser of two speeds.

Upon completion of operation of the motor 14 in reverse, i.e., upon completion of movement of the film which was exposed with fadeout effect upwardly and past the gate 46, as viewed in FIG. 2, the movable parts of the timer mechanism 57 assume the starting positions shown in FIG. 1 in which the switch 107 is open. In order to produce a fade-in effect, the switch 107 must close temporarily to start the motor 98 in a direction to gradually return the adjustable shutter blade 96 to ineffective position in which the blades 6, 96 again define an aperture of maximum size. Such temporary closing of the switch 107 is effected by an auxiliary switch closing member or trip 115 which moves the movable contact 109 against the contact 118 of the switch 107 in response to depression of the starter knob 19 following the completion of rearward transport of those (72) film frames which form the loop or loops W upon completion of the fadeout effect. The trip 115 is a projection or lobe provided on a reciprocable rodlike support 116 which is guided in stationary bearings and is biased by a torsion spring 117 which tends to maintain the left-hand end of the support 116 in abutment with the lower arm 64a of the disengaging lever 64. When the starter knob 19 is depressed for the first time following completion of rearward transport of the film frames which were exposed with the fadeout effect, the support 116 is moved to the position shown in FIG. 1 whereby the trip 115 moves against the lower end of the contact 109 and moves the latter against the contact 118 to close the switch 107. The switch 107 reopens immediately because the lower end of the contact 109 yields and permits the trip 115 to move beyond this contact to assume the illustrated inoperative position. Closing of the switch 107 results in completion of the circuit of the motor 98 which rotates the cam 103 so that the tooth 102a of the contact 102 is expelled from the notch 104, i.e., the cam 103 closes the switch 101 which is in parallel with the switch 107 and completes the circuit of the motor 98 even after the switch 107 opens, as long as the tooth 102a engages the periphery of the cam 103.

The camera is further provided with means for temporarily inactivating the trip 115 so as to prevent closing of the switch 107 in response to each depression of the starter knob 19. Such inactivating means includes a reciprocable retaining arm 119 which is guided in stationary bearings and is coupled to the arm 52a of the shifter lever 52. When the lever 52 dwells in the illustrated first position, i.e., when the gear 35 meshes with the gear 33, the lower end portion of the arm 119 extends into the path of a projection or stud 120 on the support 116 and holds the latter in the position shown in FIG. 1 so that the left-hand end of the support 116 cannot reach the lower arm 64a of the disengaging lever 64. The retaining arm 119 is reciprocable at right angles to the longitudinal direction of the support 116. As soon as the shifter lever 52 is pivoted by the knob 53 to move the gear 34 into mesh with the gear 35 and to simultaneously move the friction wheel 55 into engagement with the friction wheel 56 of the timer mechanism 57, the retaining arm 119 is lifted above and away from the projection 120 and the spring 117 is free to return the support 116 into abutment with the arm 64a whereby the trip 115 engages and thereupon bypasses the lower end of the contact 109.

The operation:

In order to start the motor 14 of the drive for the core 24 and to make customary exposures without fadeout or fade-in effect, the user simply depresses the starter knob 19 to effect closing of the master switch 20 by way of the push rod 67 and disengaging lever 64 and to simultaneously disengage the tip 16 of the starter lever 18 from the projection 15 of the gear 9. The circuit of the motor 14 is then completed from the one pole of the energy source 80, by way of the conductor 81, contacts 77, 73 of the upper two-way switch in the reversing switch, conductor 71, the winding of the motor 14, conductor 70, contacts 72, 75 of the lower two-way switch, conductor 82, contacts 68, 69 of the closed master switch 20, conductor 83, contacts 85, 89 of the closed arresting switch 84, conductor 90, and to the other pole of the energy source 80. The gears 12, 10, 9 rotate the shutter blades 6, 96 and the motor 14 also drives the pulldown 8 so that the film 7 is exposed at 18 frames per second. The motor 14 drives the core 24 of the takeup reel at the higher of the two speeds so that the core collects the exposed film at the rate of 18 frames per second. The driving connection between the motor 14 and the core 24 comprises the aforementioned parts 12, 10, 21, 22a, 22, 29, 29a, 30, 31, 33, 35, 23 and 26. The pulldown 8 draws unexposed film from the supply reel 43 and the exposed film is collected at the same rate by the core 24 which then rotates in the direction indicated by the arrow 44 (FIG. 2). The rear shutter blade 96 is held in its ineffective position so that the blades 6, 96, define an aperture of maximum size, i.e., the cutout of the rear blade 96 is in accurate registry with the cutout of the front blade 6.

If the user wishes to expose the last frames of a given film length with a fadeout effect, the starter knob 19 is retained in depressed position (master switch 20 closed) and the user simultaneously actuates the knob 53 to pivot the shifter lever 52 in a clockwise direction, as viewed in FIG. 1, whereby the extension 54 of the arm 52a pivots the carrier 38 in a clockwise direction to stress the spring 39 and to move the gear 34 into mesh with the gear 35. This takes place while the gear 33 is disengaged from the gear 35 and while the friction wheel 55 engages the friction wheel 56 of the timer mechanism 57. Thus, the speed of the core 24 is reduced to that corresponding to six frames per second and the friction wheel 56 begins to rotate the switch closing cam 86 of the timer mechanism 57 in a counterclockwise direction. Pivoting of the lever 52 in a clockwise direction causes the lug 60 to enter the notch 59 of the locking pawl 58 whereby the latter automatically retains the lever 52 in the newly selected second position under the action of the spring 58a. The pulldown 8 continues to transport the film 7 at 18 frames per second; therefore, the space within the ring-shaped wall 50 of the magazine 25 accumulates one or more loops W of normally exposed film (i.e., without a fadeout effect).

After elapse of 2 seconds (following engagement of the friction wheel 55 with the friction wheel 56), the length of the loop or loops W in the space around the core 24 corresponds to the combined length of 24 film frames and the lobe 110 of the cam 86 engages the tooth 109a of the movable contact 109 to temporarily close the switch 107. This completes the circuit of the motor 98 by way of the conductor 99, closed arresting switch 84, conductors 83, 106, closed switch 107 and conductors 108, 100 so that the motor 98 begins to move the shutter blade 96 with reference to the blade 6 to reduce the effective size of the aperture and to simultaneously rotate the cam 103 which closes the switch 101 so that the circuit of the motor 98 remains completed after the lobe 110 moves beyond the tooth 109a to permit opening of the switch 107. The circuit of the motor 98 is then completed by way of the conductor 100, closed switch 101, conductors 105, 83, closed switch 84, and conductors 90, 99. The fadeout effect continues for 4 seconds and is terminated when the tooth 85a enters the notch 87 of the cam 86 to permit opening of the arresting switch 84. The latter opens the circuit of the motor 14 so that the core 24 of the takeup reel and the pulldown 8 come to a halt. This takes place when the blade 96 of the dissolving shutter overlies the entire cutout of the front blade 6 and when the tooth 102a of the contact 102 enters the notch 104 of the cam 103 to open the switch 101 and to thus arrest the motor 98. The angular distance which the cam 86 covers during the 6 seconds following engagement of the friction wheel 55 with the friction wheel 56 is about 270°. When the switch 84 opens to arrest the motor 14, the tooth 94a of the movable contact 94 is in engagement with the periphery of the cam 86 so that the arresting switch 92 is held in closed position. The cam 103 of the motor 98 is rotated only during the last 4 seconds of rotation of the cam 86 because the first 2 seconds must elapse before the lobe 110 closes the switch 107 to start the motor 98. Thus, the fadeout effect begins with a delay of 2 seconds following the movement of gear 34 into mesh with the gear 35. As explained in connection with FIG. 3, the length of the loop or loops W in the space within the ring-shaped wall 50 of the magazine 25 equals the combined length of 24 frames after the elapse of the first 2 seconds, and such 24 frames are collected by the core 24 during the next-following 4 seconds while the core 24 rotates at the lesser of two speeds (to collect six frames per second( ). It is to be noted that, during the entire 6 -second interval, the pulldown 8 continues to draw unexposed film 7 from the supply reel 43 at the rate of 18 frames per second. Therefore, when the 6-second interval elapses and the motors 14, 98 are arrested in response to opening of the switches 84 and 101, the space within the wall 50 of the magazine 25 accommodates one or more loops W having a combined length of 72 film frames, and the frames of such loop or loops were exposed during fadeout.

When the motor 14 is arrested on opening of the switch 84, the user relaxes the pressure on the starter knob 19 so that the lever 18 is caused to pivot clockwise under the action of the spring 66 which tends to turn the disengaging lever 64 in a clockwise direction. Such pivotal movement of the disengaging lever 64 results in automatic opening of the master switch 20 and the tip 63 of the lever 64 slides along the cam face 62 but does not pivot the locking pawl 58 in a clockwise direction so that the lug 60 of the shifter lever 52 continues to extend into the notch 59. The tip 63 of the disengaging lever 64 then assumes the position which is shown in FIG. 1.

In order to transport the 72 frames of the loop or loops W rearwardly, the user simply depresses the knob 74 of the reversing switch whereby the movable contacts 72, 73 respectively engage the fixed contacts 76, 78. The circuit of the motor 14 is then completed from the one pole of the energy source 80, by way of conductor 79, contacts 76, 72, conductor 70, motor 14, conductor 71, contacts 73, 78, conductor 95, contacts 93, 94 of the closed arresting switch 92, conductors 91, 90, and to the other pole of the energy source 80. The pulldown 8 then transports the once-exposed film which forms the loop or loops W from the space around the core 24, past the gate 46 of the magazine 25, and into the space which accommodates the supply reel 43. Thus, the pulldown 8 simply transfers the loop or loops W from the space surrounding the core 24 of the takeup reel into the space which surrounds the supply reel 43 of the magazine 25. During such operation of the pulldown 8, the aforementioned blocking device holds the core 24 of the takeup reel against rotation in the counterclockwise direction, as viewed in FIG. 2. The supply reel 43 is not driven. The core 24 can be safely held against rotation in a counterclockwise direction without damage to the transmission between the output shaft 13 and the gear 35 because such transmission includes the aforementioned clutch 29a which permits the gear 29 to rotate with reference to the gear 30. However, the gear 29 continues to drive the friction wheel 55 which drives the friction wheel 56 because the locking pawl 58 continues to hold the shifter lever 52 in that (second) position in which the lug 60 extends into the notch 59. The friction wheel 56 rotates the cam 86 in a clockwise direction, as viewed in FIG. 1, so that the tooth 85a is expelled from the notch 87 to close the arresting switch 84 and that the notch 87 receives the tooth 94a to effect opening of the arresting switch 92 as soon as the cam 86 reassumes the illustrated position. The opening of arresting switch 92 results in stoppage of the motor 14. The motor 98 remains idle because the completion of its circuit necessitates closing of the master switch 20, i.e., temporary closing of the switch 107 by the lobe 110 of the cam 86 would have no effect on the motor 98 while the cam 86 rotates in a clockwise direction.

The knob 74 is biased by a spring (not shown) which tends to hold it in the illustrated position. Thus, when the user relaxes the pressure on the knob 74 (subsequent to stoppage of the motor 14 in response to opening of the arresting switch 92), the movable contacts 72, 73 reengage the fixed contacts 75, 77 so that the circuit of the motor 14 is ready for completion in response to depression of the starter knob 19. The retaining arm 119 leaves the illustrated operative position at the time the user actuates the knob 53 to pivot the shifter lever 52 to the position in which the notch 59 receives and retains the lug 60. Therefore, the spring 117 can bias the support 116 against the lower arm 64a of the disengaging lever 64. Retention of the support 116 in the illustrated inoperative position takes place after the user depresses the starter knob 19 to start the motor 14 in a forward direction whereby the arm 64a of the disengaging lever 64 closes the master switch 20 and the trip 115 temporarily closes the switch 107 to complete the circuit of the motor 98. The latter turns the adjustable shutter blade 96 with reference to the front blade 6 to gradually increase the effective size of the aperture from zero to its maximum value. The fade-in effect takes place during such relative movement between the blades 6, 96, and the fade-in effect results in renewed exposure of those 72 frames which were exposed during the preceding fadeout and which were transported by pulldown 8 from the space around the takeup reel into the space around the supply reel 43 during operation of the motor 14 in reverse (i.e., during depression of the knob 74). When the exposure with fade-in effect is completed, the cam 103 permits the switch 101 to open and to stop the motor 98 in a position in which the blade 6, 96 define an aperture of maximum size. The next-following frames of the film 7 are thereupon exposed in the customary way as long as the user continues to press the starter knob 19.

While the user presses the starter knob 19 to initiate the fade-in, the disengaging lever 64 is caused to pivot in a counterclockwise direction, as viewed in FIG. 1, whereby its tip 63 slides along the cam face 61 and causes the locking pawl 58 to release the shifter lever 52 to the action of the spring 52b. Thus, the gear 33 returns into mesh with the gear 35 so that the core 24 of the takeup reel is rotated at the normal speed of 18 frames per second and collects all of the twice-exposed film which is transported past the gate 46 by the pulldown 8. At the same time, the spring 52b causes the shifter lever 52 to move the friction wheel 55 away from the friction wheel 56 so that the cam 86 remains in the illustrated position in which the arresting switches 84, 92 are respectively closed and open.

When the shifter lever 52 is free to return to the first position shown in FIG. 1, its retaining arm 119 moves downwardly and into the path of the projection 120 on the support 116 which is held in the illustrated inoperative position by the arm 64a which holds the master switch 20 in closed position. Thus, when the user thereupon releases the starter knob 19 so that the arm 64a moves to the illustrated position under the action of the spring 66, the support 116 remains in the inoperative position because the spring 117 merely biases the projection 120 against the lower end of the retaining arm 119. The retaining arm 119 then insures that the switch 107 cannot close in response to repeated depression of the starter knob 19, i.e., when the user wishes to make exposure without fadeout effect.

An important advantage of the two-speed transmission in the drive for the core 24 of the takeup reel is that the load upon the prime mover or motor 14 changes little or not at all when the user actuates the shifter lever 52 to reduce the speed of the core. This insures that the frequency at which the film 7 is transported by the pulldown 8 remains unchanged. The timer mechanism 57 insures that the fadeout effect begins with a certain delay (2 seconds) following actuation of the shifter lever 52, and the delay suffices to enable the pulldown 8 to transport forwardly such length of film (36 frames) which is collected by the core 24 during the entire period (6 seconds) of rotation at the lesser second speed. Therefore, that length of film (namely 72 frames) which is transported forwardly during the 4 seconds of fadeout forms in the space around the core 24 one or more loops which are ready to be transported rearwardly by pulldown 8 without necessitating any rotation of the core 24 in a counterclockwise direction.

Another important advantage of the improved motion picture camera is that a single manually operable part, namely, the knob 53, suffices to reduce the speed of the transmission in the drive for the core 24 of the takeup reel and to start the timer mechanism 57. Thus, proper utilization of the camera merely requires the manipulation of three parts, i.e., the starter knob 19, the knob 53 for the shifter lever 52, and the knob 74 for reversing the direction of rotation of the prime mover 14. The operation of the camera is further simplified due to the provision of the disengaging lever 64 which can unlock the shifter lever 52 in response to start of exposures with fade-in effect and which can also control the movement of the auxiliary switch closing trip 115.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A method of manipulating motion picture film during and subsequent to fadeout and during fade-in in a motion picture camera wherein unexposed film is withdrawn from a source and the exposed film is normally collected by a reel which is confined to rotation in a direction to collect the film, comprising the steps of withdrawing unexposed film from the source at a predetermined frequency and simultaneously rotating the reel at a first speed which is high enough to enable the reel to collect all of the thus withdrawn film; continuing with the withdrawal of unexposed film at said frequency, simultaneously reducing the speed of the reel to a lesser second speed so that the reel collects only a fraction of the film and the remainder of film forms in the region of the reel at least one loose loop of predetermined length, and exposing said predetermined length of film with fadeout effect; transporting said predetermined length of the film backwards to the general region of the source; and transporting said predetermined length of film forwardly at said frequency, rotating the reel at said first speed, and exposing said predetermined length with fade-in effect.

2. A method as defined in claim 1, wherein said remainder of the film is looped around the takeup reel.

3. A method as defined in claim 1, wherein said predetermined length of film is exposed with fadeout effect with a predetermined delay following said reduction in the speed of the reel and wherein the forward transport of film during rotation of the reel at said second speed is terminated simultaneously with termination of such fadeout effect.

4. In a motion picture camera, a combination comprising a source of unexposed film; a takeup reel rotatable in a single direction to collect exposed film; transporting means operable to transport the film between said source and said reel forwardly and rearwardly at least at one predetermined frequency; adjustable drive means arranged to rotate said reel at a first speed at which the reel collects the film at the rate at which the film is transported forwardly, and at a lesser second speed at which the reel collects only a fraction of the film which is transported forwardly by said transporting means; speed changer means actuatable to adjust said drive means for operation at said second speed; dissolving shutter means operable to produce fadeout and fade-in effects; and timer means for effecting operation of said shutter means to start the fadeout effect in response to elapse of a first interval following the actuation of said speed changer means, and for arresting said transporting means after elapse of a second interval required by said shutter means to complete the fadeout effect.

5. A combination as defined in claim 4, wherein said transporting means transports forwardly during said first interval such length of film which at least approximates the combined length collected by said reel during said first and second intervals.

6. A combination as defined in claim 4, wherein said drive means comprises prime mover means and a two-speed transmission receiving torque from said prime mover means and having an output portion arranged to rotate said reel.

7. A combination as defined in claim 6, wherein said speed changer means comprises manually operated shifter means arranged to start said timer means in response to adjustment of said transmission for operation at said second speed.

8. A combination as defined in claim 7, wherein said shifter means comprises a lever pivotable by hand from a first position to a second position to thereby adjust said transmission for operation at said second speed, said timer means comprising a driven first rotary member provided on said lever and a second rotary member which receives motion from said first member in response to movement of said lever to said second position.

9. A combination as defined in claim 7, wherein said transmission comprises a carrier movable between first and second positions, first and second gears mounted on said carrier, means for respectively rotating said first and second gears at a higher speed and at a lesser speed, a third gear operatively connected with said output portion and respectively driven by said first and second gears in the first and second positions of said carrier, and means for biasing said carrier to said first position, said shifter means being operable by hand to move the carrier to said second position.

10. A combination as defined in claim 9, wherein said shifter means includes a lever which is pivotable between first and second positions respectively corresponding to first and second positions of said carrier, and further comprising means for biasing the lever to said first position.

11. A combination as defined in claim 10, further comprising locking means arranged to releasably hold said lever in said second position thereof, starter means actuatable to start said prime mover means, and disengaging means for disengaging said locking means from said lever in response to actuation of said starter means.

12. A combination as defined in claim 11, wherein said disengaging means comprises a second lever, means for biasing said second lever to an ineffective position, said second lever being arranged to leave such ineffective position and to thereby disengage said locking means from said first mentioned lever in response to actuation of said starter means.

13. A combination as defined in claim 4, wherein said transporting means transports forwardly during said first interval such length of film which at least approximates the combined length collected by said reel during said first and second intervals and wherein said shutter means comprises first blade means, second blade means movable with reference to said first blade means to produce a fadeout or a fade-in effect, electric motor means operative to move said second blade means, normally open first and second switch means each arranged to complete the circuit of said motor means in response to closing thereof, and first switch closing means arranged to close said first switch means in response to operation of said motor means, said timer means comprising second switch closing means for temporarily closing said second switch means in response to elapse of said first interval.

14. A combination as defined in claim 13, wherein said first switch closing means comprises a rotary cam and wherein said second switch closing means comprises a second rotary cam having a projection arranged to effect temporary closing of said second switch means in a predetermined angular position of said second cam.

15. A combination as defined in claim 13, wherein said drive means comprises prime mover means and starter means actuatable to start said prime mover means, and further comprising auxiliary switch closing means for temporarily closing said second switch means in response to actuation of said starter means subsequent to completion of rearward movement of film after elapse of said second interval.

16. A combination as defined in claim 15, further comprising movable retaining means for maintaining said auxiliary switch closing means in an inoperative position when said drive means is set to rotate said reel at said first speed.

17. A combination as defined in claim 16, further comprising support means for said auxiliary switch closing means and means for biasing said means against said retaining means.

18. A combination as defined in claim 16, wherein said retaining means receives motion from said speed changer means.

19. A combination as defined in claim 18, wherein said speed changer means is movable between first and second positions in which said drive means is respectively set to rotate said reel at said first and second speeds and further comprising locking means for releasably holding said speed changer means in the second position thereof and disengaging means for disengaging said locking means from said speed changer means, said drive means comprising prime mover means and starter means actuatable to start said prime mover means, said disengaging means being arranged to disengage said locking means from said speed changer means in response to actuation of said starter means and to effect closing of said second switch by way of said auxiliary switch closing means.

* * * * *